April 11, 1939.  E. D. WILSON  2,154,295
COPPER OXIDE PHOTOVOLTAIC CELL WITH IMPEDANCE LAYER
Filed April 24, 1936    3 Sheets-Sheet 1
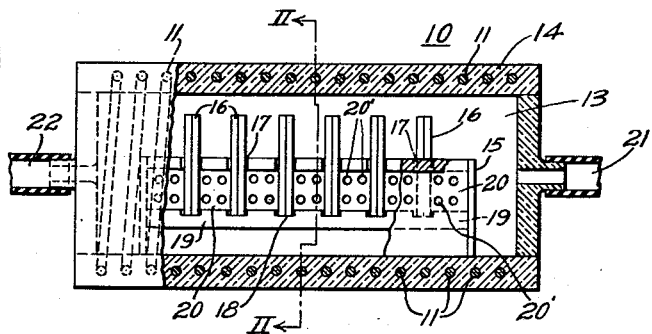
Fig. 1.
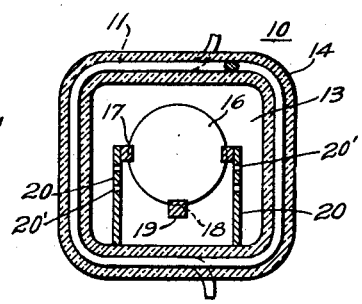
Fig. 2.
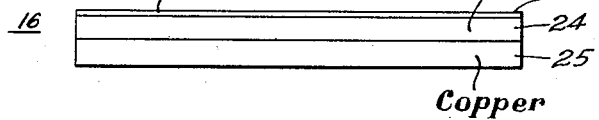
Fig. 3. Cupric Oxide / Cuprous Oxide / Copper
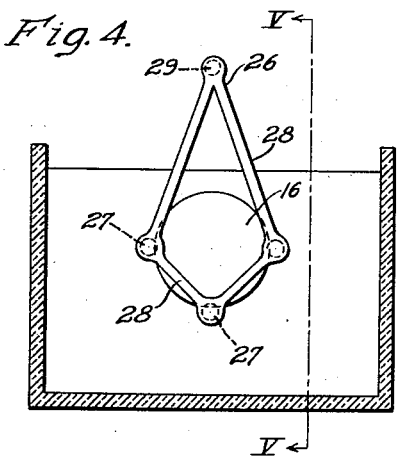
Fig. 4.
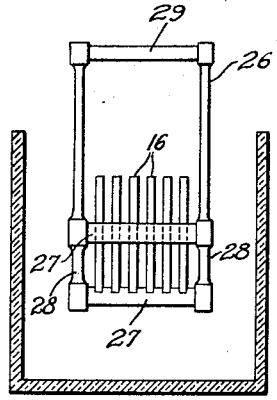
Fig. 5.
WITNESSES:
C. J. Weller.
R. W. Bailey
INVENTOR
Earl D. Wilson.
BY F. W. Lyle.
ATTORNEY April 11, 1939. E. D. WILSON 2,154,295
COPPER OXIDE PHOTOVOLTAIC CELL WITH IMPEDANCE LAYER
Filed April 24, 1936 3 Sheets-Sheet 2
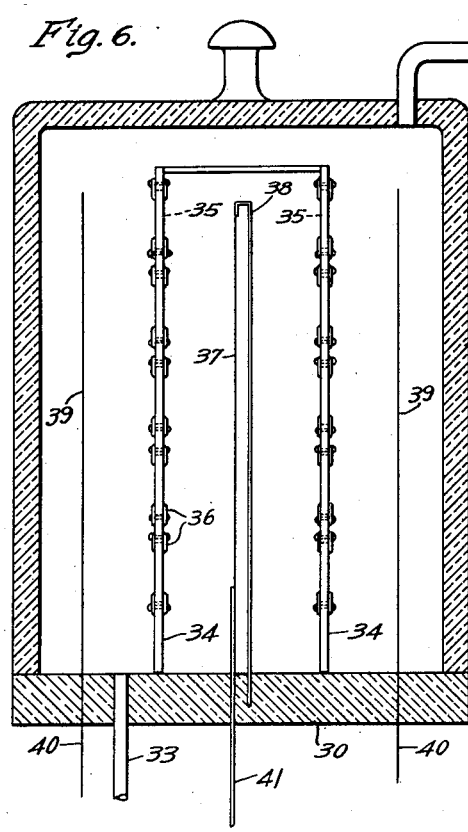
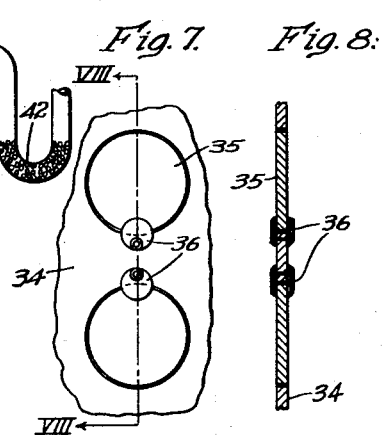
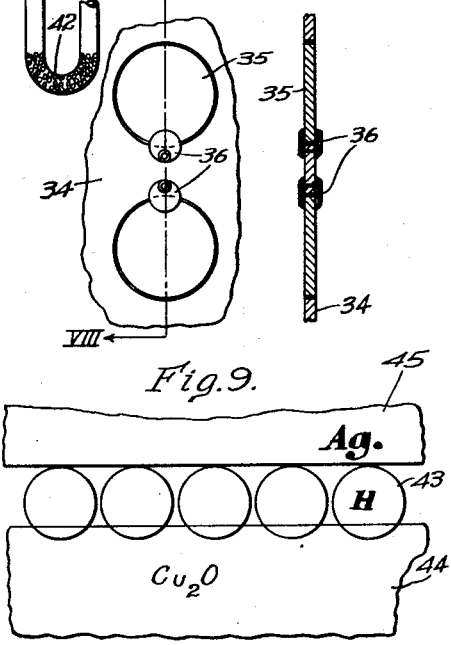
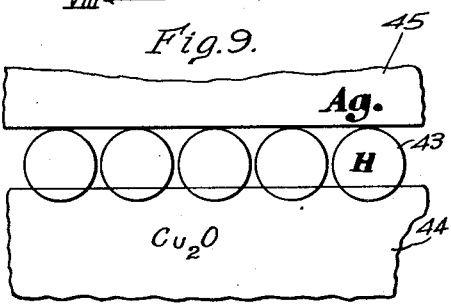
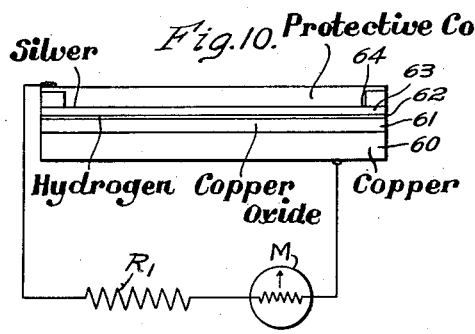
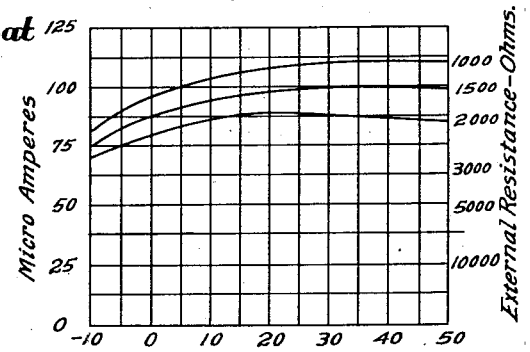
WITNESSES:
C. J. Weller.
R. W. Bailey
INVENTOR
Earl D. Wilson.
BY F. W. Lyle.
ATTORNEY April 11, 1939.  E. D. WILSON  2,154,295
COPPER OXIDE PHOTOVOLTAIC CELL WITH IMPEDANCE LAYER
Filed April 24, 1936  3 Sheets-Sheet 3

WITNESSES:
C. J. Weller.
R. W. Bailey

INVENTOR
Earl D. Wilson.
BY F. W. Syle.
ATTORNEY

Patented Apr. 11, 1939

2,154,295

UNITED STATES PATENT OFFICE 2,154,295

COPPER OXIDE PHOTOVOLTAIC CELL WITH IMPEDANCE LAYER

Earl D. Wilson, Wilkinsburg, Pa., assignor to Westinghouse Electric & Manufacturing Company, East Pittsburgh, Pa., a corporation of Pennsylvania Application April 24, 1936, Serial No. 76,156

7 Claims. (Cl. 136—89)

This application is a continuation in part of my copending applications Serial No. 578,399, filed December 1, 1931, now Patent 2,095,783, Serial No. 4,285, filed January 31, 1935, now Patent 2,095,781, and Serial No. 20,362, filed May 8, 1935, now Patent 2,095,782.

My invention relates to photo-sensitive devices and it has particular relation to photo-sensitive devices of the dry photo-voltaic type.

In the prior art, photo-sensitive devices have been constructed of a translucent film of cuprous oxide upon copper. Contact has been made to the oxide and to the copper by mechanical pressure or other equivalent means. Light passing through the copper oxide caused the electrons to pass across the juncture between the oxide and the copper. While such a cell was responsive to light, yet its sensitivity was not of a very high order. It was found that the sensitivity of such a cell was limited to the red portion of the visible spectrum, namely, the range from about 650 millimicrons to 700 millimicrons, and that the cell was not sensitive to green light, which has a position in the visible spectrum to which the human eye is most sensitive. Such a device, furthermore, had to be very carefully manufactured and assembled in view of the necessarily thin delicate coating of transparent copper oxide.

It is an object of my invention to utilize the photo-electric properties of copper oxide, but to avoid all of the above-mentioned difficulties of the copper-copper oxide cell just described.

It is another object of my invention to provide a photo-sensitive device having a copper oxide layer upon a copper base, and to provide an electron discharge path from the copper oxide to another metal on the copper oxide instead of to the copper, as in the prior art devices.

Another object of my invention is to provide an impedance between the copper oxide and a conductive layer superimposed thereon.

More specifically stated, it is an object of my invention to form a photo-sensitive device by oxidizing the copper and to form a discharge unit on the copper oxide by bombarding the copper oxide with ionized gas to produce a polarized layer on the oxide and evaporating a layer of translucent noble metal thereon whereby the copper oxide and metal are electrodes bounding an impedance discharge path across the polarized layer of gas.

A still further object of my invention is to provide a system for such copper oxide photo-voltaic cell in which the circuit contains a resistance that results in the system having substantially constant response in regard to temperature variation at the region of room temperature.

Other objects of my invention will become evident from the following detailed description taken in conjunction with the accompanying drawings, in which:

Figure 1 is a view, partly in elevation and partly in cross-section, of a preferred type of electric furnace with the photo-sensitive units in an early step of their manufacture;

Fig. 2 is a sectional view taken along the line II—II of Fig. 1;

Fig. 3 is an elevational view of a copper oxide disc as removed from the electric furnace of Fig. 1;

Fig. 4 is a cross-sectional view of an acid bath with the copper oxide discs and holder in elevation;

Fig. 5 is a sectional view taken on line V—V of Fig. 4;

Fig. 6 is a cross-sectional view of a preferred type of apparatus for bombarding the discs and for evaporating the translucent noble metal film thereon;

Fig. 7 is a side elevational view of the disc-holding means of Fig. 6;

Fig. 8 is a cross-sectional view on line VIII—VIII of Fig. 7;

Fig. 9 is an enlarged cross-sectional view of a photo-sensitive disc illustrating diagrammatically the electron discharge path of the disc;

Fig. 10 is a view partly in elevation and partly diagrammatic of a photo-sensitive cell and its circuit;

Fig. 11 is a series of curves illustrating the response of the system of Fig. 10 to temperature variation.

Figure 12:
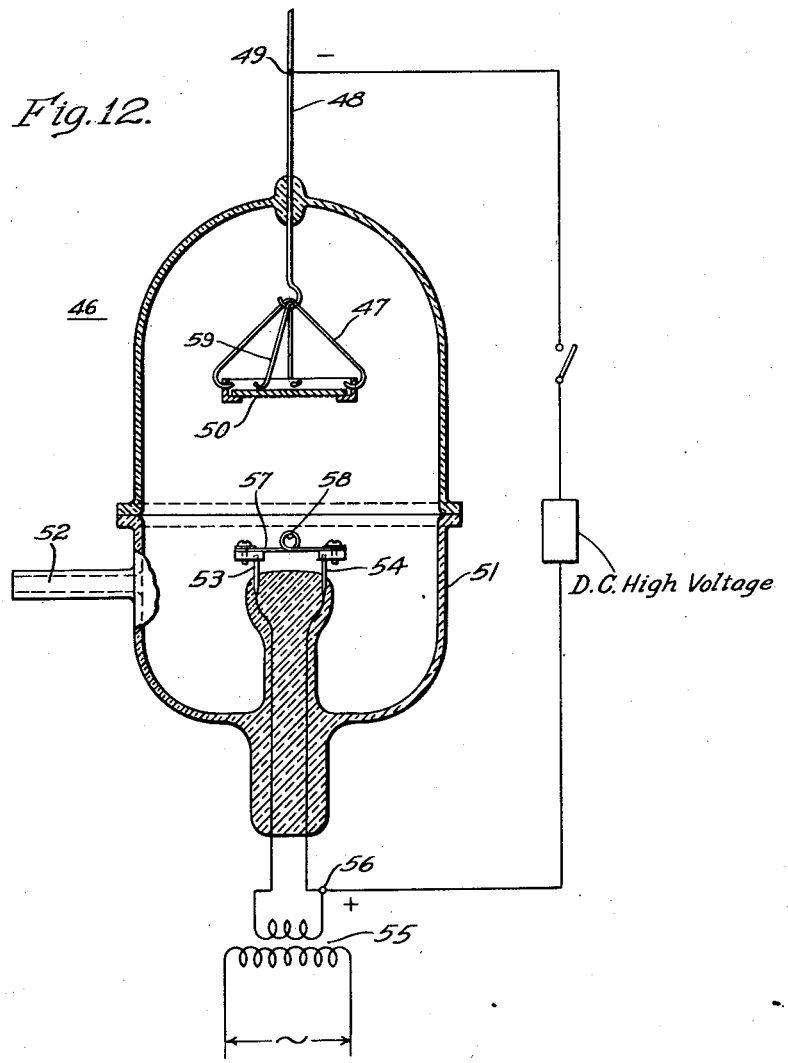
Fig. 12 is a view partly in elevation and partly in cross-section of an apparatus for making photo-cells by the glow-evaporation process.

As previously explained, my photo-sensitive device is of the copper oxide type. The copper oxide is preferably formed on a copper disc by use of an electric furnace such as 10 in Fig. 1. The electric wires 11 are embedded in suitable electrical insulation throughout the walls 14 surrounding the heating chamber 13. Within the main chamber 13 is preferably a holder 15 wide enough to hold the discs 16. These discs are placed back-to-back and held in suitable indentations 17 on the side walls 20 and indentations 18 in a supporting bar 19 extending along the bottom portion of the holder. The walls of the holder are perforated as at 20' in order to allow for suitable access of oxygen to the surfaces of the discs. Inlet and outlet ports 21 and 22 with suitable valves and pump control the type of atmosphere within the furnace 10.

The exposed surfaces of the copper discs are oxidized in flowing air at a temperature of substantially 1000° C. The layer of oxide is preferably thick enough to be opaque. The discs are then preferably heat treated by closing the valve of the inlet port 21 and attaching the outlet port 22 to a vacuum pump to remove the air from the main chamber 13 of the electric furnace 10. If desired, a special vacuum furnace may be used instead, and the discs transferred thereto for the second step of heat treating the discs in vacuum.

The discs when removed from the oxidizing furnace without vacuum treatment have the structure illustrated in Fig. 3 with the surface layer of black cupric oxide 23 over the thick layer of red cuprous oxide 24 on the base of the copper 25. As previously mentioned, the layer of cuprous oxide 24 is preferably thick enough to be opaque in order that light may not pass therethrough to cause any discharge of electrons from the cuprous oxide to the copper. If the discs are vacuum treated, however, the vacuum heat treatment breaks down the black oxide and also aids in preventing the discharge of electrons from the cuprous oxide to the copper.

The discs are then placed in a nitric acid bath illustrated in Figs. 4 and 5. A convenient holder for this step in the process is also illustrated in Figs. 4 and 5. This holder 26 has suitable supports 27 with suitable notches therein for supporting the discs side-by-side. Suitable glass connecting members 28 extend between the supports and the upper handle 29.

After the nitric acid has etched the surface to remove any impurities therefrom, the discs are rinsed in distilled water to remove the acid.

In place of treating the discs in a vacuum furnace, I have also devised an alternative method of using a nitrogen atmosphere at about 600° C. in the furnace and then inserting the discs into sulphuric acid of about 25% strength to remove black oxide prior to the etching of the discs with the nitric acid.

After the discs have been rinsed and dried, I bombard them with the ionized particles of a suitable gas. I prefer to use an apparatus similar to that illustrated in Fig. 6. This apparatus consists of a suitable base 30 having a ground glass connection with a bell jar 31 superimposed thereon. The bell jar 31 has a suitable tubulation 32 preferably in the top for the entrance of the desired atmosphere. The base 30 also preferably has an exit 33 for the removal of the atmosphere when desired. This outlet 33 can, of course, be connected with a suitable pump. The base 30 preferably supports two standards 34 having spaced holes therein in which the copper oxide discs are inserted with their copper oxide faces 35 faced toward the center. The discs are held in place by a spring clip arrangement 36 disclosed in Figs. 7 and 8. Centrally located is a rectangular sheet 37 of a noble metal, such as silver, gold or platinum, having a suitable support 38. A connection 41 extends through the base 30 of the apparatus to the negative terminal of a current source to make the rectangular sheet 37 a cathode. Two anode wires 39 rise preferably symmetrically back of the standards 34 having a connection 40 to the exterior of the device.

A suitable atmosphere is introduced into the bell jar 31. This atmosphere may be any gas which will form an ionized layer on the copper oxide surface 35 of the discs. This ionized layer may be formed of any gas which is not a corrosive material with the copper oxide. Corrosive materials cannot be used as they will form a chemical combination in place of the ionized gas layer. The gas that is used may be either inactive, such as nitrogen or carbon dioxide, or of the active type, like hydrogen. I prefer to use dry hydrogen and to pass it through a quartz powder filter 42 in the tubulation 32 and out through tubulation 33 with the equilibrium pressure adjusted to about 0.3 millimeter of mercury. About 2000 volts direct current is applied between the anode wires and the silver or other noble metal sheet. A current of about 250 milliamperes is allowed to flow for 8 seconds after which the hydrogen is pumped out and air is admitted to the vessel and the discs removed.

The discharge primarily bombards the oxide surface of the discs with the positive ions of the gas atmosphere. These ions of gas impinging upon the copper oxide layer will be of the order of one or a few atoms thick. I believe that this polarized layer of gas with its positive charge will place the electrons in the copper oxide under tension. I believe that the orbits of the polarized gas and the electrons just within the surface or on the surface of the copper oxide are interlinked so that while the tension is not sufficient to pull the electrons out of the copper oxide, yet the tension is sufficient to materially reduce the amount of work necessary to actually pull the electrons out of the copper oxide surface.

This is schematically illustrated in Fig. 9, wherein the ionized layer of gas 43 is shown interlinked with the copper oxide surface 44. An atom or molecule of gas is said to be polarized when the electronic orbits are so perturbed that an effective electrical dipole results. Two charges of opposite sign separated by a finite distance constitutes an electric dipole. In other words, the positive charge of this ionized gas has such an attraction for the electrons in the copper oxide that these electrons may be more easily pulled out of the copper oxide surface by additional suitable energy, such as the energy in a light beam.

The second action of the discharge is to sputter material from the sheet 37 on the copper oxide surface 35 of the discs. The sputtering of this material is carried on at such a rate that it will deposit a thin translucent film over the adjacent exposed surfaces 35 in Fig. 6 of the copper oxide rectifier. The film 45 has been illustrated diagrammatically on the layer of gas 43 in Fig. 9.

In Fig. 12 is an illustration of another type of apparatus that might be used in place of that illustrated in Fig. 6. A bell jar 46 has a conductive holder 47 suspended from a conductive hook 48 extending through the top of the bell jar to the negative terminal 49 of a high voltage direct current source. The etched copper oxide disc 50 is placed face downward in this holder. A contact 59 can be used to ensure an electrical connection to the copper back of the disc. The jar is seated with grease on the complementary vessel 51 connected to an exhaust system and a gas supply, preferably argon, through the tube 52. Two adjacent electrodes 53 and 54 in the vessel 51 are connected to a transformer circuit 55. One of these electrodes is also connected with the positive terminal 56 of the high voltage direct current source connected to the holder 47.

After the jar is completely exhausted of air, argon is admitted to a pressure of several tenths of a millimeter of mercury. About 500 volts direct current is applied between the holder 47 as a cathode and one of the electrodes 53 or 54. The resulting glow is allowed to continue for 10 seconds at about 50 milliamperes. The surface of the copper oxide disc 50 is covered with an ionized layer of gas as previously explained. Another non-corrosive gas may be used.

The argon is removed and a tungsten wire 57 with a coil containing a bead of silver 58 or other noble metal is connected between the electrodes 53 and 54 and heated by means of current from the transformer circuit 55. The silver evaporates to deposit a thin transparent or translucent coating on the bombarded oxide surface after which the disc is removed.

The above-described process of oxidizing, heat treating, acid etching, bombardment, and evaporation of a noble metal creates an electron discharge path illustrated in Fig. 9 from the copper oxide 44 through the ionized gas layer 43 to the conductive layer of a noble metal 45. The process as described results in there being an impedance between the copper oxide and the noble metal of from 10,000 ohms to 10 megohms per square inch. This value is taken at the voltage of the cell in response to light, namely, at $\frac{1}{10}$ of a volt. I prefer to conduct the process so that the impedance between the copper oxide on the conductive noble metal is from $\frac{1}{10}$ to 3 megohms per square inch, and preferably of the order of ½ megohm per square inch.

The disc as illustrated in Fig. 10, now has the copper layer 60 with the copper oxide layer 61, and superimposed thereon is the ionized gas layer schematically illustrated at 62, and the silver, gold or platinum transparent layer 63 on top of that. This last transparent layer is then covered with a suitable protective layer 64 which may, for example, be ordinary collodion. The noble metal 63 forms the negative terminal of the cell, and the copper oxide, or rather the copper oxide with its copper base, forms the positive terminal. The terminals of the cell are then suitably connected with an external circuit such as the resistance $R_1$ and the meter M to form a closed circuit. The cell is generating in response to light, and, therefore, a cover for the sensitive surface may be used in place of a switch in the circuit. The cell will operate a meter without any other source of electric current. If desired, a suitable relay may replace the resistance and meter of Fig. 10.

I have discovered that my device has an advantage in temperature response over the devices of the prior art. In such devices, the response fell off very rapidly as the temperature increased. If my photo-cell is connected with a circuit having a resistance in excess of 1000 ohms, and preferably 1500 ohms, it will have a substantially constant response in the region of room temperature. This fact is brought out in the curves disclosed in Fig. 11, in which the response is substantially constant for circuits having from 1000 to 2000 ohms between 20° C. and 40° C. The circuit with 1500 ohms has a very flat curve in this region. These responses were tested at 50 footcandles.

Although I have shown and described certain specific embodiments of my invention, I am fully aware that many modifications thereof are possible, such as the shape, arrangement and materials of the elements of both the photo-sensitive device and the apparatus and steps for constructing it. My invention, therefore, is not to be restricted except insofar as is necessitated by the prior art.

I claim as my invention:

1. The method of making a photo-sensitive device which comprises oxidizing copper to form copper oxide thereon and forming an electron discharge combination with said copper oxide by bombarding the surface of said copper oxide with hydrogen ions and covering the bombarded surface with a metal layer thin enough to be translucent.

2. The method of making a photo-sensitive device which comprises oxidizing copper to form copper oxide thereon, surrounding said oxidized copper with hydrogen at a pressure of a fraction of a millimeter of mercury, bombarding the surface of said copper oxide with hydrogen ions and covering the bombarded surface with a metal layer thin enough to be translucent.

3. The method of making a photo-sensitive device which comprises oxidizing copper to form copper oxide thereon, surrounding said oxidized copper with hydrogen at a pressure of a fraction of a millimeter of mercury, bombarding the surface of said copper oxide with hydrogen ions for several seconds and covering the bombarded surface with a metal layer thin enough to be translucent.

4. The method of making a photo-sensitive device which comprises oxidizing copper to form copper oxide thereon, surrounding said oxidized copper with hydrogen at a pressure of a fraction of a millimeter of mercury, bombarding the surface of said copper oxide with hydrogen ions for several seconds with a current of the order of 250 milliamperes, and covering the bombarded surface with a metal layer thin enough to be translucent.

5. The method of making a photo-sensitive device which comprises placing oxidized copper in a gaseous atmosphere of hydrogen between two electrodes, one of which is a noble metal, connecting the noble metal electrode as a cathode facing the oxidized copper and the other electrode as an anode, and bombarding the oxidized copper with hydrogen and sputtering the noble metal thereon in a thin film.

6. The method of making a photo-sensitive device which comprises placing oxidized copper in a gaseous atmosphere of hydrogen at a pressure of a fraction of a millimeter of mercury between two electrodes, one of which is a noble metal, connecting the noble metal electrode as a cathode facing the oxidized copper and the other electrode as an anode, and bombarding the oxidized copper with hydrogen and sputtering the noble metal thereon in a thin film.

7. The method of making a photo-sensitive device which comprises placing oxidized copper in a gaseous atmosphere of hydrogen between two electrodes, one of which is a noble metal, connecting the noble metal electrode as a cathode facing the oxidized copper and the other electrode as an anode, and bombarding the oxidized copper with hydrogen and sputtering the noble metal thereon in a thin film for several seconds with a current of the order of 250 milliamperes.

EARL D. WILSON.